United States Patent [19]

Liebl

[11] Patent Number: 4,920,741

[45] Date of Patent: May 1, 1990

[54] APPARATUS FOR VENTING THE ROTOR STRUCTURE OF A COMPRESSOR OF A GAS TURBINE POWER PLANT

[75] Inventor: Josef Liebl, Dachau, Fed. Rep. of Germany

[73] Assignee: MTU Motoren-UND Turbinen-Union München GmbH, Munich, Fed. Rep. of Germany

[21] Appl. No.: 329,955

[22] Filed: Mar. 29, 1989

Related U.S. Application Data

[62] Division of Ser. No. 20,125, Feb. 27, 1987, abandoned.

[30] Foreign Application Priority Data

Jan. 9, 1987 [DE] Fed. Rep. of Germany ....... 3606598
Jan. 12, 1987 [DE] Fed. Rep. of Germany ....... 3627306

[51] Int. Cl.$^5$ ................................................ F02C 7/18
[52] U.S. Cl. ................................. 60/39.07; 60/39.83; 415/115
[58] Field of Search ................. 60/39.07, 39.23, 39.83, 60/751, 760; 415/115, 116, 117

[56] References Cited

U.S. PATENT DOCUMENTS

| | | | |
|---|---|---|---|
| 3,614,257 | 10/1971 | Campbell | 415/116 |
| 4,291,531 | 9/1981 | Campbell | 60/751 |
| 4,296,599 | 10/1981 | Adamson | 415/115 |
| 4,337,313 | 4/1969 | Moore | 415/115 |
| 4,657,482 | 4/1987 | Neal | 60/39.07 |
| 4,719,747 | 1/1989 | Willkop et al. | 60/39.07 |

Primary Examiner—Louis J. Casaregola
Attorney, Agent, or Firm—Ladas & Parry

[57] ABSTRACT

Method of apparatus for venting rotor parts of an axial flows compressor of a gas turbine power plant having an axial diffuser arranged behind the rotor and stator vanes at the last compressor stage. An annular chamber is formed downstream of the last rotor disk between adjacent rotor and stator parts and compressed air downstream of the diffuser is introduced into the chamber. The air in the chamber is divided into two individual streams, one of which is recycled to the compressor through an annular slot between the rotor and guide vanes at the last compressor stage and the other of which is discharged as a stream of leakage air into the secondary air system of the turbine.

9 Claims, 4 Drawing Sheets

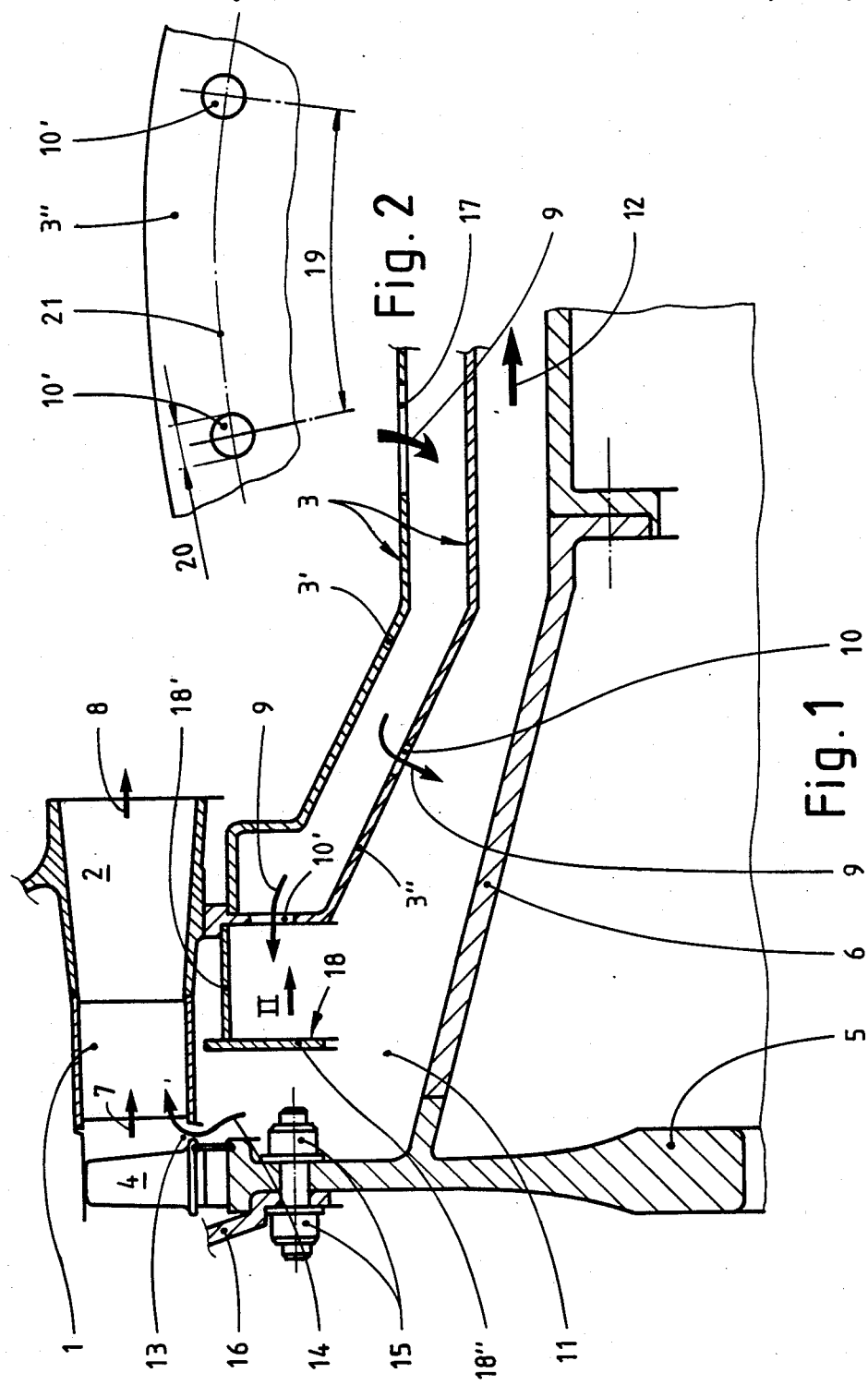

4,920,741

APPARATUS FOR VENTING THE ROTOR STRUCTURE OF A COMPRESSOR OF A GAS TURBINE POWER PLANT

This is a Divisional on application Ser. No. 020,125 filed 02/27/87 (abandoned).

FIELD OF THE INVENTION

The invention relates to apparatus for venting the rotor structure of a compressor of a gas turbine power plant, particularly at the last stage of the compressor.

DESCRIPTION OF PRIOR ART

It has proven difficult to provide an effective venting concept which produces a considerable reduction of the temperature of secondary cooling air and thus also of the structural parts at the rear or downstream face of the rotor.

Traditional venting constructions which, for example, have removed compressed air between the last rotor and stator stages for flow ono the root portions of the rotor have high temperature of the air as a result of the compressor temperature profile. Additionally, air friction between the rotating and stationary parts at the downstream face of the last rotor produces relatively extensive heating of the secondary or control air removed at the last compressor stage, which causes unnecessarily high temperature in the structural parts and leads to degrading of the desired optimization of the radial clearances between the rotor blades or vanes and the surrounding housing.

A decisive disadvantage of the conventional solutions is that an increase in the life can be maintained in most cases only by increasing the thickness of the rotating parts or by the use of high strength materials.

In an earlier proposal, additional venting of the inside of the rotor is obtained, for instance, by providing openings at the rear surface of the rotor. This has the great disadvantage that the vent temperature is extremely high as a result of heating of the secondary air and the required amount of air necessary to pass through the slot of the labyrinth main seal of the rotor arranged in front cannot be obtained to the desired extent, particularly during transient operation.

SUMMARY OF THE INVENTION

An object of the present invention is to provide a venting apparatus which is of relatively simple construction and assures a comparatively low vent temperature, even in the case of sudden changes in load.

A further object of the invention is to provide a venting apparatus and method which contributes to preservation of optimum vane clearance.

The above objects are achieved in accordance with the invention by apparatus comprising:

an annular chamber located in the vicinity of the last stage of the compressor and having an inlet for supply of a portion of the compressed air discharged from an axial diffuser downstream of the last stage;

said annular chamber having one outlet for flow of a first portion of the compressed air supplied thereto as a discharge stream to a secondary air system of the turbine and a second outlet for flow of a second portion of the compressed air supplied to the chamber as a recycle stream to the compressor via an annular slot provided between the rotor and stator vanes of the last compressor stage;

said apparatus including stationary and rotating portions between which said annular chamber is defined.

In further accordance with the invention, a substantially quantitatively adjustable circulation of compressor outlet air can be provided by forming openings in the wall of a housing of the combustion chamber and utilizing the pressure rise in the region of the stator vanes at the last stage of the compressor and the adjacent diffuser.

In accordance with the invention, the openings, preferably in simplified form as holes of large cross section, can be arranged at given locations in order to assure sufficient venting. The amount of air to be fed and thus the cross section of the holes can be established in accordance with the heat produced by air friction and be optimized by the temperature and strength requirements of the associated rotor parts.

BRIEF DESCRIPTION OF THE FIGURES OF THE DRAWING

FIG. 1 is a diagrammatic longitudinal sectional view, at the last stage of a compressor for a turbine, showing a venting system in accordance with the invention.

FIG. 2 shows a portion of an inner housing of a combustion chamber as seen in the direction of arrow II in FIG. 1.

DETAILED DESCRIPTION OF PREFERRED EMBODIMENTS

Figure 3:
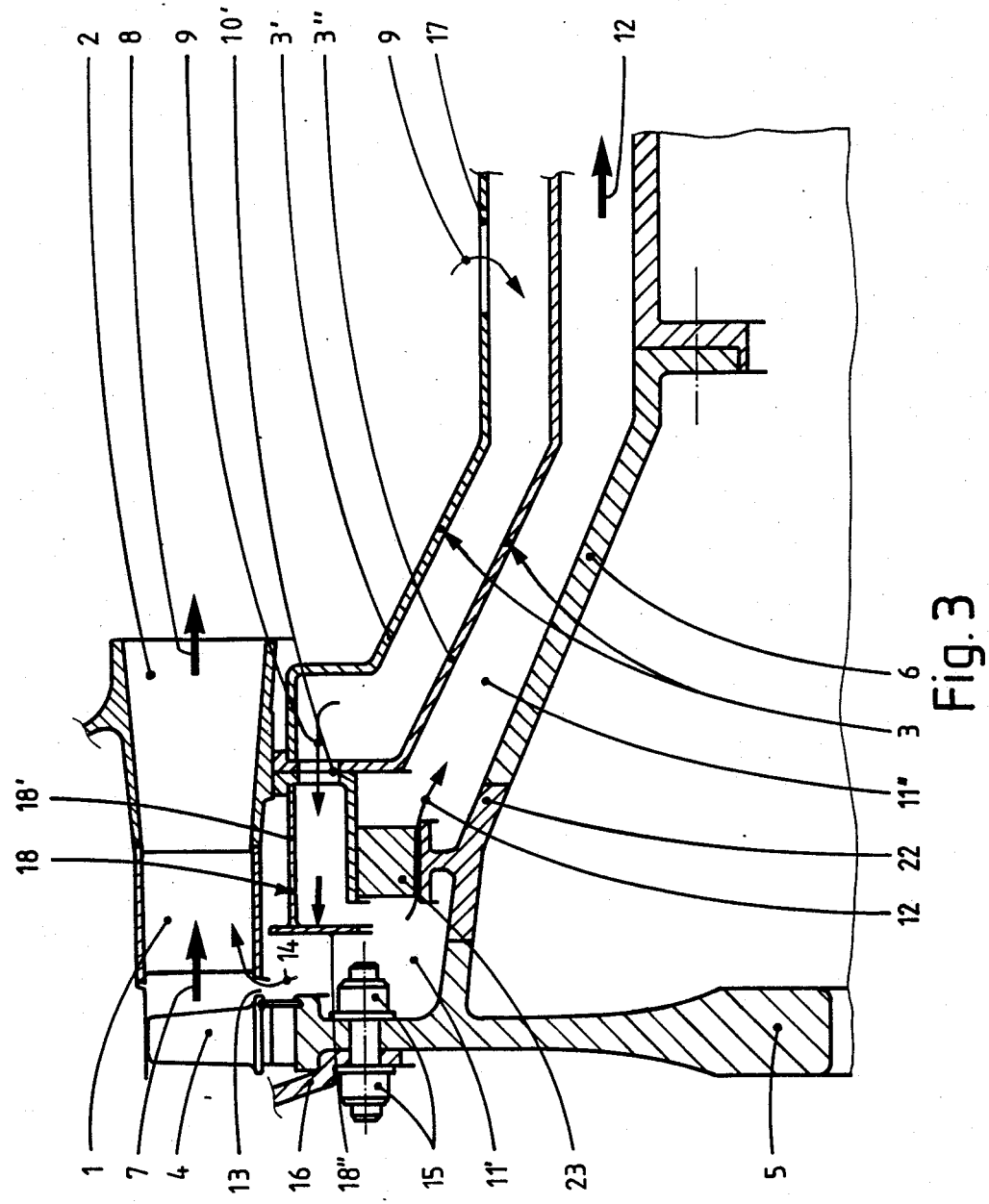
FIG. 3 is a view similar to FIG. 1 showing another embodiment of the invention.

Referring to FIG. 1, therein is seen the last stage of an axial flow compressor of a gas turbine power plant. The compressor has stator vanes 1 at the last stage which guide compressed air to an axial diffuser 2 from the rotor vanes 4 at the last compressor stage. The rotor vanes 4 are secured for rotation on the rotor disk 5 of the last stage.

The invention is directed to the venting of the rotor by utilizing a portion of the stream 8 of compressed air which has passed through the last stage of the compressor and the diffuser 2. The portion of the stream 8 which is utilized for venting is shown as stream 9. An annular chamber or space 11 is formed downstream of the rotor disk 5 between opposed rotor and stator parts and receives the stream 9 of compressed air. From the space 11, the stream 9 is divided essentially into two individual streams 12 and 14. Stream 14 is recycled to the flow channel of the compressor via an annular slot 13 formed between the rotor vanes 4 and the stator vanes 1 of the last compressor stage. The stream 12 is discharged as leakage air into the secondary air system of the turbine, for example, for turbine cooling purposes.

The stream 9 of compressed air is diverted from the stream 8 which is discharged at the outlet of the diffuser 2 and the stream 9 flows through outer and inner double walls 3', 3" of a combustion chamber housing 3, into the annular space 11. The outer wall 3' has openings 17 for the flow of the compressed air thereinto and inner wall 3" has openings 10, 10' for flow of the compressed air into space 11. The walls 3', 3" enclose an annular channel which is disposed between space 11 and the discharge region of the compressed air 8 downstream of diffuser 2. The compressed air at the compressor outlet passes through the stator vanes 1 and the adjoining diffuser 2 and after flowing from inner wall 3" the compressed air is guided by guide devices 18 into the annular space 11 where it undergoes the division into the individual streams 12 and 14.

The guide devices 18 face respective openings 10' to guide the stream of air flowing therefrom, the guide devices 18 being formed as angle plates having one leg 18' extending in the axial direction below the unit compressed of the guide vanes 1 and diffuser 2 and a second leg 18" extending radially into space 11 and secured by leg 18' in parallel, spaced relation opposite a radial portion of inner wall 3" which contains the respective openings 10'.

As seen in FIG. 1, the annular space 11 to be vented is circumferentially bounded at the outside by the guide vanes 1, the guide device 18 and the diffuser 2, at the rear by the double wall 3 of the combustion chamber housing, at the inside by a conical portion 6 of the rotor shaft and at the front by the rotor disk 5. The rotor disk 5 is connected by attachment bolts 15 to the rotor structure 16 which carries the rotor blades of the upstream stages. The air present in the annular space 11 undergoes additional heating due to air friction. The magnitude of the air friction is a function of a number of factors, such as speed of rotation of the rotor, the radial position of space 11, the surrounding pressure, the air temperature and, in particular, surface features on disk 5 such as, its smoothness, the rotating bolts 15, etc. The rotating bolts 15 which are required for attachment to the rotor structure 16 produce increased heat within the annular space 11. In order to keep the heating of the air as small as possible, the annular space 11 must be sufficiently ventilated.

The pressure within the annular space 11 is adapted by the annular slot 13 to the pressure between the rotor vanes 4 and the stator vanes 1.

By the arrangement in space and size of the openings 10, 10' in wall 3" and of the openings 17 in wall 3', sufficient venting of the annular space 11 with compressed air 9 taken from the compressor outlet can be achieved as a result of the increase in pressure of the air flow 7 between the entrance to the stator vanes 1 and the air flow 8 at the exit of the diffuser 2.

The optimal mixing or utilization of the amount of compressed air 9 can be effected within the annular space 11 by the locally directed influence of the air flow by the stationary guide devices 18 which are fastened to the combustion chamber housing 3. Furthermore, the guide devices 18 result in a definite reduction of the heat transmission from the outside through the inner wall of the guide vanes 1.

The individual stream 14, which is recycled through the annular slot 13 to the primary air stream in the compressor between the rotor blades 4 and the axial guide vanes 1 of the last compressor stage, experiences rapid acceleration to the speed of the primary air stream within guide vanes 1 and diffuser 2 by the suction produced by the primary air flow.

The arrangement and size of the openings 17, which serve essentially for the supply of venting air to the high-pressure turbine, are so selected to insure a sufficient mixing of the primary air stream and a reduction in the compressor temperature profile and hence a minimal vent inlet temperature.

The spacing 19 and the diameter 20 of the openings 10' (shown as holes in FIG. 2) depend on the required amount of venting. Furthermore, the radial position of the axis of openings 10' should correspond as far as possible with the radial position of maximum air friction, i.e. at the level of bolts 15.

In accordance with FIG. 3, the annular space can be divided by a seal 22, 23 into an outer part 11' which communicates with the annular slot 13 and an inner part 11" from which air is discharged as stream 12 to the secondary air system of the turbine. The compressed air 9 coming from the compressor outlet flows, via openings 10' arranged at the level of the guide devices 18 secured to the inner wall 3", into outer part 11' and then at reduced pressure and quantity through the seal 22, 23, into the inner part 11".

Referring further to FIG. 3, the seal is composed of stationary part 23 and rotating part 22, and is disposed radially inwards of the axial leg or section 18' of the guide devices 18 and axially spaced from the radially protruding leg or section 18" of the guide plates 18. The stationary part 23 of the seal can be secured integrally with the support for the axial section 18'.

The utilization of the seal 22, 23 in the embodiment in FIG. 3 makes it possible to reduce the pressure in the inner part 11" of the annular space which results in a reduction of compressive force on the outer surface of the conical portion 6 of the rotor shaft and consequent axial thrust on the rotor shaft. In the outer part 11' of the annular space, the air is at a higher pressure and venting can take place effectively, particularly in view of the relatively pronounced heating of the secondary air in part 11' of the annular space.

In view of the above, it is also advantageous, as seen in FIG. 3, for the openings 10' to be arranged substantially at the level of the maximum air friction developed in the outer part 11' of the annular space, over the circumference of the combustion chamber housing 3 on the radially outer section of the combustion chamber wall.

Figure 4:
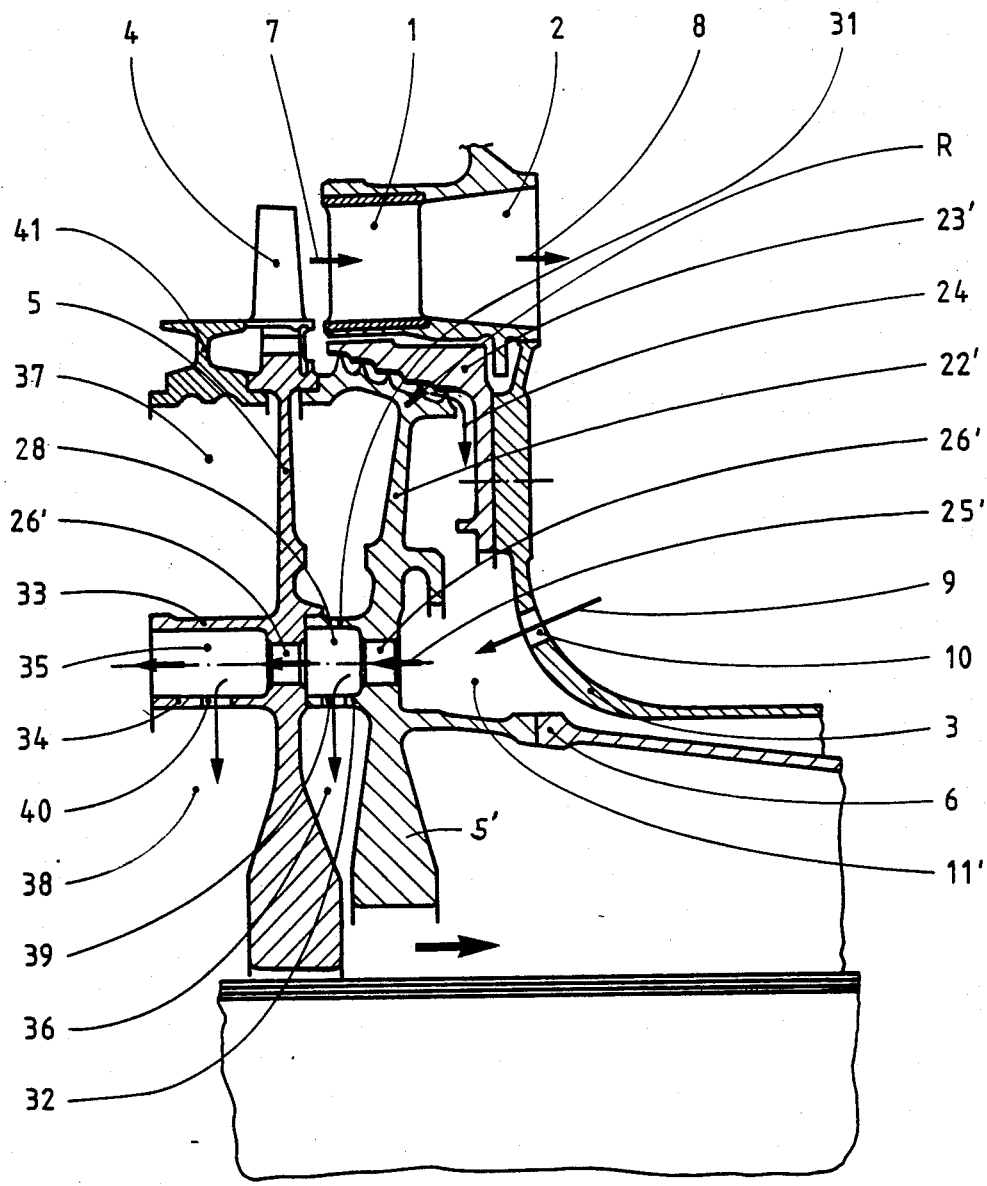
FIG. 4 is a view similar to FIG. 1 showing a further embodiment of the invention.

In accordance with the embodiment in FIG. 4, the compressed air 9 coming from the compressor outlet is fed through the openings 10 of the combustion chamber housing 3 directly to the inner part 11' of the annular space and is mixed thereat with leakage air 24 which flows, at reduced pressure, past labyrinth seal 22', 23' from the flow channel of the compressor. A mixture of air 25', produced from streams 9 and 24, flows in a direction opposite the direction of the main flow 7 within the compressor towards the root portions of the rotor disks which are close to the axis of rotation of the rotor. As a result of this mixing operation, an optimal temperature level is obtained and the heating effect due to air friction produced on the leakage air 24 no longer has any detrimental consequences.

In the embodiment of FIG. 4, therefore, there is obtained, in addition to air supply to the inner space of the rotor which is independent of the behavior of the slot of the labyrinth seal 22', 23' arranged upstream of space 11', a decisive lowering of the inlet temperature of the vent air because of the formation of the mixed air stream 25'. The magnitude of the reduction in the vent air temperature is determined essentially by the quantity of compressed air 9 supplied to space 11'. However, since an increase in pressure is developed within the annular space 11' due to the openings 10, the axial thrust on the rotor is increased which could lead to a limit in the supplied amount of compressed air 9.

In a further advantageous arrangement in the embodiment of FIG. 4, the rotating part 22' of the labyrinth seal, constituted as the rotor main seal, can be a part of a disk 5' of the compressor which is arranged behind the last rotor disk 5.

A seal support R at the outer circumferential region of the rotating part 22' serves as a spacer between the rotor disk 5 and the supporting disk 5'. The stationary part 23' of the labyrinth seal is radially inwards of the axial guide vanes 1 and the axial diffuser 2 and is secured to a radial portion of the combustion chamber housing 3.

Figure 5:
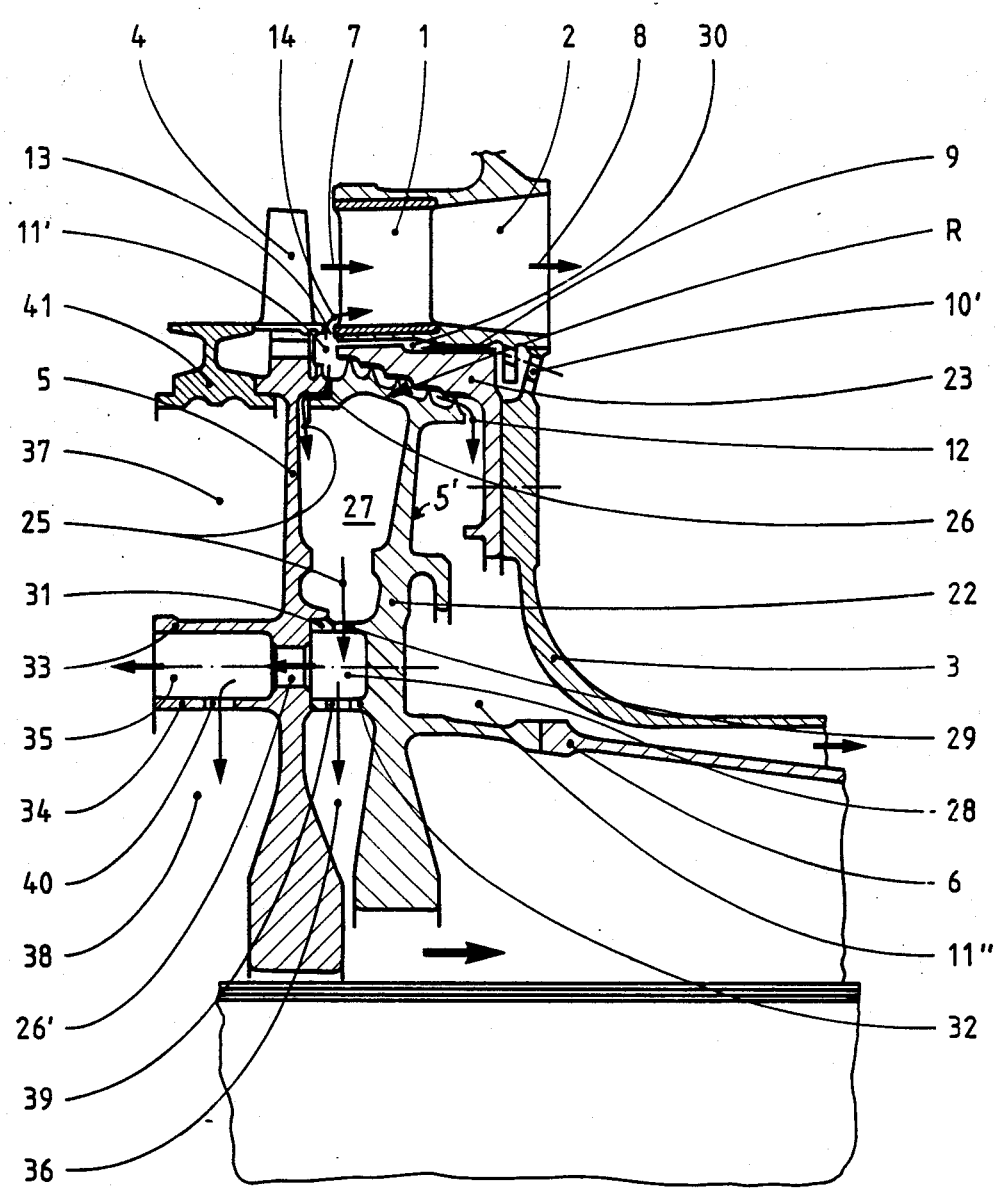
FIG. 5 is a view similar to FIG. 1 showing another embodiment of the invention.

The possibly detrimental effect due to the increase in axial thrust caused by pressurization in space 11' in the embodiment of FIG. 4, can be completely circumvented by the embodiment shown in FIG. 5. Herein the outer part 11' of the annular space is arranged between a front section of the seal support R, serving as a spacer between disks 5 and 5' and the stationary part 23 of the seal on one side and end surfaces on the rotor disk 5 proximate the root regions of the vanes 4 on the other side. The outer part 11' of the annular space is in communication with a channel 30 located below the unit composed of guide vanes 1 and diffuser 2 to conduct compressed air 9 taken from the compressor outlet to outer part 11'. A portion of the compressed air 9 discharged at the outlet of the diffuser 2 flows through openings 10' in housing 3 of the combustion chamber 3 at the level of the channel 30. The outer part 11' of the annular space is also in communication via slot-shaped inlet openings 26, with an outer intermediate space 27 between the rotor disk 5 and the rotating part 22 of the labyrinth seal which is integral with supporting disk 5'. The space 27 is vented via the supporting disk 5' and rotor disk 5, as will be explained later. Similar parts of FIGS. 4 and 5 are affected by this and the following description applies to both figures.

The intermediate space 27 supplies air to air chambers 28, 35 formed respectively in axial spacers 31, 32, 33 and 34 of the rotor disks. The spacers define annular inner and outer intermediate spaces 27, 36 and 37, 38. The air chambers 38, 35 receive an air mixture 25' in FIG. 4 or removal air 25 in FIG. 5 respectively from the inner part 11' of the annular space in FIG. 4 or from the outer intermediate space 27 in FIG. 5.

Furthermore, the air mixture 25' in FIG. 4 is fed, via openings 26' in the supporting disk 5' to the air chamber 28 and then to the air chamber 35 via the openings 26' in rotor disk 5. In FIG. 5, the removal air 25 flows via openings 29 in axial spacer 31 into the air chamber 28 and then into air chamber 35 via openings 26' in disk 5. The air chambers 28, 35 in both FIGS. 4 and 5 are in communications via inner openings 30, 40 in the axial spacers 32, 34, with the inner intermediate spaces 36, 38 for venting the compression air against the root portions of the disks.

The decisive advantage of shifting the inlet openings 26 in FIG. 5 radially outwards is that the feeding of the vented or control air can take place substantially independently of the heating of the secondary air by air friction and the influence of the slot of the labyrinth seal. Furthermore, an additional decrease in the temperature of the removal air 25 used for the venting can be obtained by the construction of the flow path of the compressed air and therefore of the type of guidance of the compressed air 9 into the outer part 11' of the annular space.

The size of the openings 26 as well as the maximum slot length, the maximum depth of recess, the radii and the circumferential distribution or maximum number of slots are based on strength requirements. The maximum cross section of the resultant opening determines the greatest possible amount of removal air 25 and the pressures in the annular intermediate spaces 27, 36 and in the air chambers, for example air chamber 28, within the rotor.

Within the outer annular intermediate space 27, the quantity of the inwardly flowing removal air 25 effects a cooling of the sealing disk 22, which is heated from the outside by air friction. The removal air 25 flows through the openings 29, which preferably are boreholes, into the air chambers 28 disposed radially inwards thereof. The removal air 25 is then divided in the manner already described.

This construction of the venting apparatus makes it possible for the rotor disks to achieve an optimum reduction of temperature at the root portions or hubs thereof to the level of the temperature of the rims of the disks, thereby avoiding heat transfer which enables optimization of the radial clearance between the rotor vanes and the stator housing for all loads during uniform and transient operations.

Another advantage of the formation of the annular intermediate spaces 27, 36 as shown in FIG. 5 is that, due to the smaller change in pressure, the tap or bypass pressure for venting can be correspondingly low or a sufficiently high pressure difference can be present at the inlet openings 26. Within the air chambers 28 which are separated from each other in the circumferential direction by radial webs 100 (FIG. 5), a circumferential speed can be imparted to the air stream 25 in connection with the aforementioned inlet and outlet openings 29, 39 which belong to each of said vapoarted air chambers 28.

Due to the enforced circumferential flow, there is produced within the air chambers 28 a smaller change in pressure than takes place comparatively in the outer and inner intermediate spaces 27, 36 due to the equilibration of the velocity of the air and the free flow which takes place.

Furthermore, in FIG. 5, the openings 10' are located at a radial position which corresponds essentially to the radial position of the maximum air friction which is developed locally in the outer part 11' of the annular space, as has already been explained.

As can furthermore be noted in FIGS. 4 and 5, the rotor disks 5 can be supported by one another by conventional rotor spaces rings 41 arranged in the outer circumferential region.

The invention is particularly suitable for axial-flow gas turbine jet engines of aircraft, but, of course, is not so limited.

Although the invention has been described in relation to specific embodiments thereof, it will become apparent to those skilled in the art that numerous modifications and variations thereto can be made within the scope and spirit of the attached claims.

What is claimed is:

1. Apparatus for cooling the rotor of a multi-stage axial compressor of a gas turbine power plant and for maintaining optimum rotor vane clearance in which the compressor has an axial diffusor located downstream of the rotor vanes and stator vanes of the last stage of the compressor, said apparatus comprising:

seal means at the last stage of the compressor for sealing a flow channel in the compressor in which compressed air flows but permitting leakage flow of air therethrough, said seal means including a rotating part and a stationary part, the rotor of the compressor including a rotor disk at the last compressor stage and a further rotor disk downstream thereof, said rotor having an axis of rotation, said disks having root portions closest to said axis of rotation, said rotating part of the seal means being secured to the peripheries of said rotor disk at the last compressor stage and said further rotor disk, a combustion chamber into which the compressed air from the compressor is supplied, said combustion chamber including a housing which supports said stationary part of the seal means, means for bleeding off air in the flow channel of the compressor at a location between the stator and rotor vanes at the last compressor stage and supplying the bled air to said seal means, said bled air flowing through said seal means, an annular chamber formed between said further rotor disk and said housing of the combustion chamber for receiving bled air which has flowed through said seal means, said combustion chamber housing having an opening through which compressed air which has passed through the diffusor can enter said annular chamber and be mixed therein with the bled air which has flowed through the seal means, and flow channel means provided in said disk at the last compressor stage and said further disk downstream thereof for flow of the mixture of air in said annular chamber in a direction opposite the direction of flow of the compressed air in said flow channel and radially inwards against said root portions of said disks.

2. Apparatus as claimed in claim 1 wherein said rotating part of said seal means is secured to said rotor disk at the last compressor stage and to said further disk downstream thereof to serve as a spacer between said disks.

3. Apparatus as claimed in claim 2 wherein said stationary part of said seal means is secured to said combustion chamber housing to extend therefrom radially inwards of said diffusor and of the stator vanes of the last stage of the compressor.

4. Apparatus as claimed in claim 1 wherein said flow channel means comprises an air chamber between said disks, an opening in said further disk providing communication between said annular chamber and said air chamber and an outlet for said air chamber for flow of air therefrom radially inwards along the root portions of said disks.

5. Apparatus as claimed in claim 4 comprising axial spacer means between said further disk and said rotor disk at the last compressor stage, said air chamber being formed in said axial spacer means.

6. Apparatus as claimed in claim 4 wherein said rotor disk at the last compressor stage has an opening in communication with said air chamber for conveying air therefrom and means for conveying said air to the root portion of said rotor disk at the last compression stage on a surface thereof opposite that cooled by the air from said outlet of said air chamber.

7. Apparatus as claimed in claim 6 wherein said means for conveying air from said air chamber to the opposite surface of the root portion of the rotor disk at the last compression stage comprises axial spacer means between the rotor disk at the last compression stage and the next upstream rotor disk, said axial spacer means including inner and outer walls defining a further chamber communicating with said air chamber via said opening in said rotor disk at the last compressor stage, said inner wall having an outlet opening therein.

8. Apparatus as claimed in claim 7 wherein said air chamber and said further air chamber are contained in rotating portions of the apparatus to impart circumferential velocity to the mixture of leakage and compressed air therein.

9. Apparatus as claimed in claim 1 wherein said seal means is located radially outwards of said opening in the combustion chamber through which compressed air which has passed through the diffusor is introduced into said annular chamber.

* * * * *